(12) United States Patent
Wu

(10) Patent No.: US 12,177,877 B2
(45) Date of Patent: Dec. 24, 2024

(54) SENDING METHOD, INTERFERENCE HANDLING METHOD, TERMINAL, AND NETWORK-SIDE DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 348 days.

(21) Appl. No.: 17/562,298

(22) Filed: Dec. 27, 2021

(65) Prior Publication Data

US 2022/0124742 A1 Apr. 21, 2022

Related U.S. Application Data

(63) Continuation of application No. PCT/CN2020/097979, filed on Jun. 24, 2020.

(30) Foreign Application Priority Data

Jul. 4, 2019 (CN) .......................... 201910601043.8

(51) Int. Cl.
*H04W 4/00* (2018.01)
*H04W 72/044* (2023.01)
(Continued)

(52) U.S. Cl.
CPC ....... *H04W 72/542* (2023.01); *H04W 72/044* (2013.01); *H04W 72/21* (2023.01); *H04W 72/541* (2023.01); *H04L 27/2602* (2013.01)

(58) Field of Classification Search
CPC . H04W 72/542; H04W 72/044; H04W 72/21; H04W 72/541; H04W 24/02;
(Continued)

(56) References Cited

U.S. PATENT DOCUMENTS 11,304,191 B2 * 4/2022 Zhou ..................... H04L 5/0085
11,343,064 B2 * 5/2022 Padaki .................. H04L 1/0003
(Continued)

FOREIGN PATENT DOCUMENTS

CN 108093487 A 5/2018
CN 108616346 A 10/2018
(Continued)

OTHER PUBLICATIONS

Mediatek, Inc., "On in-device coexistence between LTE and NR sidelinks", 3GPP TSG RAN1 WG1 Meeting #97, R1-1906557, Reno, USA, May 13-17, 2019.

*Primary Examiner* — Chuong T Ho

(74) *Attorney, Agent, or Firm* — Price Heneveld LLP

(57) ABSTRACT

This disclosure provides a sending method, an interference handling method, a terminal, and a network-side device. The sending method includes: sending first information to a network-side device in a case of interference, where the first information includes at least one of the following: first indication information, where the first indication information is used to indicate first expectation information autonomously determined by the terminal, and the first expectation information includes a type of each transmission time position in a transmission period; and carrier type information, where the carrier type information corresponds to the first expectation information, or the carrier type information corresponds to second expectation information selected and determined by the terminal.

16 Claims, 5 Drawing Sheets

(51) Int. Cl.
 *H04W 72/21* (2023.01)
 *H04W 72/541* (2023.01)
 *H04W 72/542* (2023.01)
 *H04L 27/26* (2006.01)

(58) Field of Classification Search
 CPC . H04W 24/10; H04W 88/06; H04W 72/0446; H04L 27/2602; H04L 27/26025; H04J 11/005; H04J 11/0023
 USPC .................................................. 370/329, 330
 See application file for complete search history.

(56) References Cited

U.S. PATENT DOCUMENTS

| | | | |
|---|---|---|---|
| 2011/0243077 A1* | 10/2011 | Tazaki | H04L 47/38 370/328 |
| 2016/0337102 A1 | 11/2016 | Xin et al. | |
| 2019/0082424 A1 | 3/2019 | Nammi et al. | |
| 2019/0229781 A1 | 7/2019 | Jin et al. | |
| 2020/0120678 A1* | 4/2020 | Zhou | H04W 72/1215 |
| 2021/0092662 A1 | 3/2021 | Takahashi et al. | |
| 2021/0410150 A1 | 12/2021 | Hong | |
| 2022/0353875 A1* | 11/2022 | Jiang | H04L 5/14 |

FOREIGN PATENT DOCUMENTS

| | | |
|---|---|---|
| CN | 109644334 A | 4/2019 |
| CN | 110495203 A | 11/2019 |
| EP | 3537626 A1 | 11/2019 |
| JP | 11261518 A | 9/1999 |
| WO | 2015123968 A1 | 8/2015 |
| WO | 2018031704 A1 | 2/2018 |
| WO | 2018172620 A1 | 9/2018 |
| WO | 2018236586 A1 | 12/2018 |
| WO | 2019001684 A1 | 1/2019 |
| WO | 2019031212 A1 | 2/2019 |

* cited by examiner

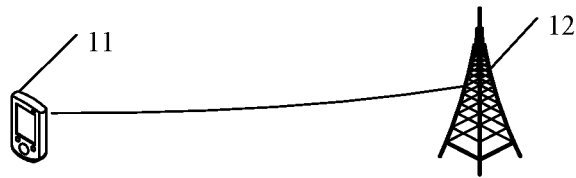

FIG. 1

```
Send first information to a network-side device in a case of interference,
  where the first information includes at least one of the following: first
indication information, where the first indication information is used to
  indicate first expectation information autonomously determined by a
  terminal, and the first expectation information includes a type of each
   transmission time position in a transmission period; and carrier type
information, where the carrier type information corresponds to the first
 expectation information, or the carrier type information corresponds to
second expectation information selected and determined by the terminal
```
/ 201

FIG. 2

| 00 | 00 | 10 | 01 | 01 |

FIG. 3a

| UL | UL | F | DL | DL |

FIG. 3b

| 00000 | 00100 | 10001 | 01000 | 01100 |

FIG. 4a

| UL (expected UL) | UL (non-expected UL) | F (expected UL) | DL (expected DL) | DL (non-expected DL) |

FIG. 4b

Receive first information sent by a terminal in a case of interference, where the first indication information is used to indicate first expectation information autonomously determined by the terminal, and the first expectation information includes a type of each transmission time position in a transmission period; and carrier type information, where the carrier type information corresponds to the first expectation information, or the carrier type information corresponds to second expectation information selected and determined by the terminal — 501

Adjust information related to a transmission time position based on the first information — 502

FIG. 5

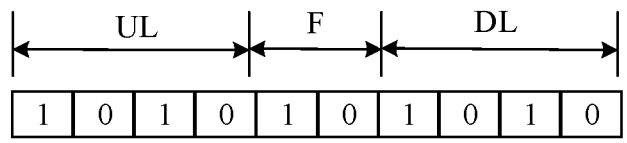

FIG. 6

SENDING METHOD, INTERFERENCE HANDLING METHOD, TERMINAL, AND NETWORK-SIDE DEVICE

CROSS-REFERENCE TO RELATED APPLICATIONS

The present application is a continuation application of International Application No. PCT/CN2020/097979 filed on Jun. 24, 2020, which claims priority to Chinese Patent Application No. 201910601043.8, filed in China on Jul. 4, 2019, which are incorporated herein by reference in their entireties.

TECHNICAL FIELD

Embodiments of this disclosure relate to the field of communications technologies, and in particular, to a sending method, an interference handling method, a terminal, and a network-side device.

BACKGROUND

With development of communications technologies, a same terminal may be equipped with a plurality of transceivers supporting different RAT radio access technologies (RAT), for example, a long term evolution LTE radio transceiver, a wireless fidelity Wi-Fi radio transceiver, a Bluetooth radio transceiver, and a global navigation satellite system (GNSS) radio transceiver.

However, for one terminal equipped with a plurality of transceivers, interference tends to occur on the terminal. For example, at neighboring or harmonic frequencies, a receiver of terminal may receive interference from a transmitter of the terminal, resulting in poor communication performance of the terminal.

SUMMARY

Embodiments of this disclosure provide a sending method, an interference handling method, a terminal, and a network-side device, to resolve a problem in the related art that communication performance of a terminal is poor due to interference.

To resolve the foregoing problem, this disclosure is implemented as follows:

According to a first aspect, an embodiment of this disclosure provides a sending method, performed by a terminal. The method includes:

sending first information to a network-side device in a case of interference, where the first information includes at least one of the following:
  first indication information, where the first indication information is used to indicate first expectation information autonomously determined by the terminal, and the first expectation information includes a type of each transmission time position in a transmission period; and
  carrier type information, where the carrier type information corresponds to the first expectation information, or the carrier type information corresponds to second expectation information selected and determined by the terminal.

According to a second aspect, an embodiment of this disclosure provides an interference handling method, performed by a network-side device. The method includes:

receiving first information sent by a terminal in a case of interference; and
  adjusting information related to a transmission time position based on the first information, where
  the first information includes at least one of the following:
  first indication information, where the first indication information is used to indicate first expectation information autonomously determined by the terminal, and the first expectation information includes a type of each transmission time position in a transmission period; and
  carrier type information, where the carrier type information corresponds to the first expectation information, or the carrier type information corresponds to second expectation information selected and determined by the terminal.

According to a third aspect, an embodiment of this disclosure further provides a terminal. The terminal includes:

a first sending module, configured to send first information to a network-side device in a case of interference, where the first information includes at least one of the following:
  first indication information, where the first indication information is used to indicate first expectation information autonomously determined by the terminal, and the first expectation information includes a type of each transmission time position in a transmission period; and
  carrier type information, where the carrier type information corresponds to the first expectation information, or the carrier type information corresponds to second expectation information selected and determined by the terminal.

According to a fourth aspect, an embodiment of this disclosure further provides a network-side device. The network-side device includes:

a second receiving module, configured to receive first information sent by a terminal in a case of interference; and
  an adjustment module, configured to adjust information related to a transmission time position based on the first information, where
  the first information includes at least one of the following:
  first indication information, where the first indication information is used to indicate first expectation information autonomously determined by the terminal, and the first expectation information includes a type of each transmission time position in a transmission period; and
  carrier type information, where the carrier type information corresponds to the first expectation information, or the carrier type information corresponds to second expectation information selected and determined by the terminal.

According to a fifth aspect, an embodiment of this disclosure further provides a terminal. The terminal includes a processor, a memory, and a computer program stored in the memory and capable of running on the processor. When the computer program is executed by the processor, the steps of the foregoing sending method are implemented.

According to a sixth aspect, an embodiment of this disclosure further provides a network-side device. The network-side device includes a processor, a memory, and a computer program stored in the memory and capable of running on the processor. When the computer program is executed by the processor, the steps of the foregoing interference handling method are implemented.

According to a seventh aspect, an embodiment of this disclosure further provides a computer-readable storage medium. The computer-readable storage medium stores a computer program, and when the computer program is executed by a processor, the steps of the foregoing sending method applied to the terminal or the steps of the foregoing interference handling method applied to a network-side device are implemented.

BRIEF DESCRIPTION OF THE DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

FIG. 1 is a structural diagram of a network system to which an embodiment of this disclosure may be applied;

FIG. 2 is a flowchart of a sending method according to an embodiment of this disclosure;

FIG. 3a is a first schematic diagram of a bitmap according to an embodiment of this disclosure;

FIG. 3b is a first schematic diagram of a transmission period according to an embodiment of this disclosure;

FIG. 4a is a second schematic diagram of a bitmap according to an embodiment of this disclosure;

FIG. 4b is a second schematic diagram of a transmission period according to an embodiment of this disclosure;

FIG. 5 is a flowchart of an interference handling method according to an embodiment of this disclosure;

FIG. 6 is a third schematic diagram of a bitmap according to an embodiment of this disclosure;

DESCRIPTION OF EMBODIMENTS

Figure 7:
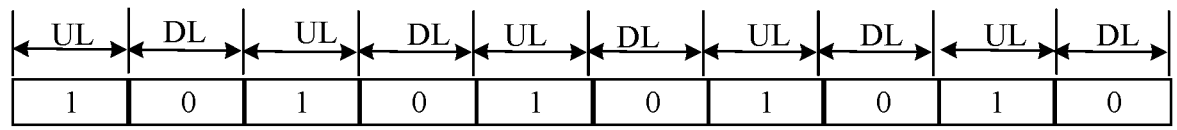
FIG. 7 is a fourth schematic diagram of a bitmap according to an embodiment of this disclosure.

The following clearly and completely describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains without creative efforts based on the embodiments of this disclosure shall fall within the protection scope of this disclosure.

The terms "first", "second", and the like in this application are used to distinguish between similar objects instead of describing a specific order or sequence. In addition, the terms "comprise", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. In addition, the term "and/or" used in this application indicates at least one of connected objects. For example, "A and/or B and/or C" represents the following seven cases: Only A exists, only B exists, only C exists, both A and B exist, both B and C exist, both A and C exist, and all A, B, and C exist.

FIG. 1 is a structural diagram of a network system to which an embodiment of this disclosure may be applied. As shown in FIG. 1, the network system includes a terminal 11 and a network-side device 12, and communication can be performed between the terminal 11 and the network-side device 12.

In this embodiment of this disclosure, the terminal 11 may also be referred to as user equipment (User Equipment, the terminal). In an actual application, the terminal 11 may be a mobile phone, a tablet personal computer (Tablet Personal Computer), a laptop computer (Laptop Computer), a personal digital assistant (personal digital assistant, PDA), a mobile Internet device (Mobile Internet Device, MID), a wearable device (Wearable Device), an in-vehicle device, or the like. The network-side device 12 may be a base station, a relay, an access point, or the like.

For ease of understanding, the following describes some content in the embodiments of this disclosure:

I. In-Device Coexistence (IDC)

Same UE may be equipped with a plurality of different radio transceivers, for example, a long term evolution (LTE) radio transceiver, a 5th Generation (5G) radio transceiver, a wireless network Wi-Fi radio transceiver, a Bluetooth Bluetooth radio transceiver, and a global navigation satellite system (GNSS) radio transceiver. At a neighboring frequency part or a harmonic frequency part, a receiver of the UE may receive interference from a transmitter of the UE. Such interference may come from a same radio access technology (RAT) or different RATs.

When the UE is working under the 3rd Generation Partnership Project (3rd Generation Partnership Project, 3GPP) and an IDC problem has occurred, the UE may indicate its desire (Desire) for downlink reception of discontinuous reception (Discontinuous Reception, DRX) information to a network side, thereby avoiding interference from other RATs (such as Wi-Fi) to the 3GPP frequency.

In the embodiments of this disclosure, frequency point and frequency are interchangeable, and desire and expectation are interchangeable.

II. Bandwidth Part (BWP)

In a 5G system, the UE may support only a relatively small operating bandwidth (for example, 5 megahertz (MHz)), but a cell on the network side supports a relatively large bandwidth (for example, 100 MHz). A small bandwidth part in which the UE works in the large bandwidth is considered as a BWP.

From a perspective of a UE configuration, for different UE functions, a BWP may be used as a BWP in a cell. A plurality of different BWPs use a same hybrid automatic repeat request (HARQ) entity.

The network side may configure one or more BWPs for the UE, and may switch a currently activated BWP of the UE by using a BWP switching (Switching) command (for example, physical downlink control channel (Physical Downlink Control Channel, PDCCH) indication information), that is, activate a new BWP and deactivate the currently activated BWP. Currently, the UE can activate only one BWP for one cell. Different BWPs may use different carrier numerologies (Carrier Numerology), for example, different subcarrier spacings (SCS). Different subcarrier spacings cause orthogonal frequency division multiplex (OFDM) symbols and/or time domain lengths and time domain positions of slots (Slot) scheduled by the network side to be different.

III. 5G New Radio (NR) Time Division Duplex (TDD) Configuration

The network side may configure different uplink and downlink slot and symbol position information for a plurality of different BWPs of the UE. The uplink and downlink slot position information includes:

an uplink and downlink position allocation period (for example, repetition based on a period of 5 milliseconds (ms));

quantities of consecutive downlink slots and symbols starting from a start position in a period (for example, there are five slots in 5 ms, and the first two are downlink slots); and quantities of consecutive uplink slots and symbols counted backward from an end position in a period (for example, there are five slots in 5 ms, and the last two are uplink slots).

It should be understood that a slot and a symbol in the middle of "downlink slots and symbols" and "uplink slots and symbols" are a "flexible slot and symbol". The "flexible slot and symbol" may be flexibly set as an uplink or downlink slot and symbol based on network-side control/indication information. For example, there are five slots in 5 ms, and the first two are downlink slots, and the last two are uplink slots. In this case, the middle third slot is a flexible slot.

IV. Dual Connectivity (DC)

When the UE works in DC mode, two cell groups are configured for the UE: a master cell group (MCG) and a secondary cell group (SCG). The MCG includes at least a primary cell (PCell), and may additionally include one or more secondary cells (SCell). The SCG includes at least one primary secondary cell (PSCell), and may additionally include one or more secondary cells (SCell).

The following describes a sending method in an embodiment of this disclosure.

FIG. 2 is a flowchart of a sending method according to an embodiment of this disclosure. The sending method in this embodiment of this disclosure is applied to a terminal.

As shown in FIG. 2, the sending method may include the following steps.

Step 201: Send first information to a network-side device in a case of interference.

In this embodiment of this disclosure, the first information includes at least one of the following:

first indication information, where the first indication information is used to indicate first expectation information autonomously determined by the terminal, and the first expectation information includes a type of each transmission time position in a transmission period; and carrier type information, where the carrier type information corresponds to the first expectation information, or the carrier type information corresponds to second expectation information selected and determined by the terminal.

It should be noted that in this embodiment of this disclosure, the first expectation information and the second expectation information may be both used for determining the type of each transmission time position in a transmission period. However, manners of determining the first expectation information and the second expectation information are different. Detailed descriptions are as follows:

The first expectation information is autonomously determined by the terminal. For example, the terminal may autonomously determine the type of each transmission position in the transmission period completely based on a requirement of the terminal.

The second expectation information is selected and determined by the terminal. Specifically, a plurality of templates may be preset, and the type of each transmission position in the transmission period in each template is fixed. The terminal may select a template to determine the type of each transmission position in the transmission period.

Apparently, in comparison with the second expectation information, the first expectation information can improve flexibility of determining the type of each transmission position in the transmission period.

The following describes the first indication information in detail.

In a specific implementation, optionally, the type of a transmission time position includes any one of the following: a sending time position, a receiving time position, and a flexible time position.

In other words, the type of each transmission time position in the transmission period may be a sending time position, a receiving time position, or a flexible time position.

It should be understood that the type of each transmission time position in the transmission period may be the same. For example, the type of each transmission time position in the transmission period is a sending time position. Certainly, the type of each transmission time position in the transmission period may also be different. For example, the transmission period may include a sending time position, a receiving time position, and a flexible time position.

In a case that the transmission period includes at least two types of transmission time positions, further, transmission time positions of a same type in the transmission period may be consecutive. Certainly, transmission time positions of a same type in the transmission period may alternatively be inconsecutive. This may be specifically determined based on an actual requirement, and is not limited in this embodiment of this disclosure.

In an actual application, the first indication information may specifically have a plurality of representation forms. Detailed descriptions are as follows:

In a first implementation, in a case that the first expectation information includes the type of each transmission time position in the transmission period, the first indication information may include:

transmission period information, used to indicate a quantity of transmission time positions in the transmission period; and transmission time position information, used to indicate the type of each transmission time position in the transmission period.

For example, the transmission period information indicates that the quantity of transmission time positions in the transmission period is 5; and the transmission time position information indicates: two consecutive transmission time positions starting from a start position in the transmission period are sending time positions, two consecutive transmission time positions counted backward fromfrom an end position in the transmission period are receiving time positions, and a third position starting from the start position in the transmission period is a flexible time position.

In a second implementation, the first indication information may include a bitmap, and the first expectation information is indicated by using the bitmap.

In a case that the first expectation information includes the type of each transmission time position in the transmission period, the bitmap may indicate the type of each transmission time position in the transmission period by using K×N bits. A value of N is equal to the quantity of transmission time positions in the transmission period; and K is related to types of the transmission time positions included in the transmission period. For example, if the transmission period includes one or two types of transmission time positions, the value of K may be 1; or if the transmission period includes three types of transmission time positions, the value of K may be 2.

Specifically, K×N bits may be classified into N groups of bits, and K bits included in each group of bits are consecutive in the bitmap. The N groups of bits identify N transmission time positions, and each group of bits corresponds to one transmission time position on a one-to-one basis.

For ease of understanding, an example in which the transmission period includes three types of transmission time positions and the value of K is 2 is used for description.

If two bit values in a group of bits are 00, the type of a transmission time position identified by the group of bits is a sending time position;

if two bit values in a group of bits are 01, it indicates that the type of a transmission time position identified by the group of bits is a receiving time position; or if two bit values in a group of bits are 10, it indicates that the type of a transmission time position identified by the group of bits is a flexible time position.

As shown in FIG. 3a, the bitmap includes five groups of bits, where from left to right, bit values in a first group are 00, bit values in a second group are 00, bit values in a third group are 10, bit values in a fourth group are 01, and bit values in a fifth group are 01.

As can be learned from the foregoing content, the transmission period indicated by the bitmap shown in FIG. 3 includes five transmission time positions. It is assumed that the first group of bits corresponds to a first transmission time position in the transmission period, the second group of bits corresponds to a second transmission time position, the third group of bits corresponds to a third transmission time position, the fourth group of bits corresponds to a fourth transmission time position, and the fifth group of bits corresponds to a fifth transmission time position.

In this case, the transmission period indicated by the bitmap shown in FIG. 3a is shown in FIG. 3b. The first and second transmission time positions are sending time positions, the third transmission time is a flexible time position, and the fourth and fifth transmission time positions are receiving time positions.

In FIG. 3a and FIG. 3b, UL represents a sending time position, DL represents a receiving time position, and F represents a flexible time position.

In the second implementation, a correspondence between a bit group and a transmission time position may be prescribed by a protocol, configured by a network side, or determined by the terminal. This may be specifically determined based on an actual requirement, and is not limited in this embodiment of this disclosure.

As can be learned from the foregoing content, the first indication information in the second implementation may include only the bitmap. In comparison with the first implementation, this implementation can reduce an information size of the first indication information, and therefore can reduce signaling overheads.

In this embodiment of this disclosure, optionally, the first expectation information may further include expectation identification information of each transmission time position in the transmission period.

Further, the expectation identification information is used to indicate either of the following:
  indicating that the transmission time position is an expected transmission time position; and
  indicating that the transmission time position is a non-expected transmission time position.

In an actual application, if a transmission time position is an expected transmission time position, it indicates that the terminal expects to perform transmission at the transmission time position; or if a transmission time position is a non-expected transmission time position, it indicates that the terminal does not expect to perform transmission at the transmission time position.

As can be learned from the foregoing content, the flexible time position may be set as a sending time position or a receiving time position. However, before the flexible time position is set as a sending time position or a receiving time position, the flexible time position may be flexibly used for sending or receiving. Therefore, for the flexible time position, optionally, the expectation identification information may be used to indicate any one of the following:
  indicating that the transmission time position is an expected sending time position;
  indicating that the transmission time position is a non-expected sending time position;
  indicating that the transmission time position is an expected receiving time position; and
  indicating that the transmission time position is a non-expected receiving time position.

In a case that the first expectation information includes the type of each transmission time position in the transmission period and the expectation identification information of each transmission time position in the transmission period,
  for the first implementation, the first indication information may further include:
    the expectation identification information of each transmission time position in the transmission period.

For the second implementation, the first indication information may indicate the first expectation information by using (K+j)×N bits, where j is related to whether the transmission period includes a flexible time position. For example, if the transmission period does not include a flexible time position, a value of j may be 1; or if the transmission period includes a flexible position, a value of j may be 3.

Specifically, (K+j)×N bits may be classified into N groups of bits, and (K+1) bits included in each group of bits are consecutive in the bitmap. The N groups of bits identify N transmission time positions, and each group of bits corresponds to one transmission time position on a one-to-one basis. K consecutive bits in each group of bits jointly indicate the type of each transmission time position in the transmission period; and j consecutive bits jointly indicate the expectation identification information of each transmission time position in the transmission period.

For ease of understanding, an example in which the transmission period includes three types of transmission time positions, the value of K is 2, the transmission period includes a flexible position, and a value of j is 3 is used for description.

It is assumed that first two consecutive bits in each group of bits jointly indicate the type of each transmission time position in the transmission period, and that last three consecutive bits jointly indicate the expectation identification information of each transmission time position in the transmission period. In addition, a first bit in the last three bits indicates "expected" or "non-expected"; and second and third bits in the last three bits jointly indicate a set type of a flexible time position.

If bit values in a group of bits are 00000, it indicates that the type of a transmission time position identified by the group of bits is a sending time position, and the sending time position is an expected sending time position;
  if bit values in a group of bits are 00100, it indicates that the type of a transmission time position identified by the group of bits is a sending time position, and the sending time position is a non-expected sending time position;
  if bit values in a group of bits are 01000, it indicates that the type of a transmission time position identified by the group of bits is a receiving time position, and the receiving time position is an expected receiving time position;
  if bit values in a group of bits are 01100, it indicates that the type of a transmission time position identified by the group of bits is a receiving time position, and the sending time position is a non-expected receiving time position;
  if bit values in a group of bits are 10000, it indicates that the type of a transmission time position identified by the group of bits is a flexible time position, and the flexible time position is an expected flexible time position;
  if bit values in a group of bits are 10001, it indicates that the type of a transmission time position identified by the group of bits is a flexible time position, and the flexible time position is an expected sending time position;
  if bit values in a group of bits are 10010, it indicates that the type of a transmission time position identified by the group of bits is a flexible time position, and the flexible time position is an expected receiving time position;
  if bit values in a group of bits are 10100, it indicates that the type of a transmission time position identified by the group of bits is a flexible time position, and the flexible time position is a non-expected flexible time position;
  if bit values in a group of bits are 10101, it indicates that the type of a transmission time position identified by the group of bits is a flexible time position, and the flexible time position is a non-expected sending time position; or
  if bit values in a group of bits are 10110, it indicates that the type of a transmission time position identified by the group of bits is a flexible time position, and the flexible time position is a non-expected receiving time position.

As shown in FIG. 4a, the bitmap includes five groups of bits, where from left to right, bit values in a first group are 00000, bit values in a second group are 00100, bit values in a third group are 10001, bit values in a fourth group are 01000, and bit values in a fifth group are 01100.

As can be learned from the foregoing content, the transmission period indicated by the bitmap shown in FIG. 4 includes five transmission time positions. It is assumed that the first group of bits corresponds to a first transmission time position in the transmission period, the second group of bits corresponds to a second transmission time position, the third group of bits corresponds to a third transmission time position, the fourth group of bits corresponds to a fourth transmission time position, and the fifth group of bits corresponds to a fifth transmission time position.

In this case, the transmission period indicated by the bitmap shown in FIG. 4a is shown in FIG. 4b. The first transmission time position is a sending time position, and is an expected sending time position; the second transmission time position is a sending time position, and is a non-expected sending time position; the third transmission time position is a flexible time position, and is an expected sending time position; the fourth transmission time position is a receiving time position, and is an expected receiving time position; and the fifth transmission time position is a receiving time position, and is a non-expected receiving time position.

In FIG. 4a and FIG. 4b, UL represents a sending time position, DL represents a receiving time position, and F represents a flexible time position.

In this embodiment of this disclosure, further, the first expectation information corresponds to a processing capability of the terminal.

The processing capability is used to indicate a transmission processing capability of the terminal. For example, if an uplink sending slot of the UE is a slot n, a time position at which the UE can receive a feedback after performing sending is a slot n+k; or if a downlink receiving slot of the UE is a slot n, a time position at which the UE can send a feedback after performing receiving is a slot n+k.

The first expectation information corresponds to the processing capability of the terminal, and it may be understood that a correspondence between an (expected) sending time position and an (expected) receiving time position in the transmission period corresponds to the processing capability of the terminal.

Specifically, the (expected) sending time position and the (expected) receiving time position corresponding to the (expected) sending time position in the transmission period correspond to the processing capability of the terminal.

For example, if an uplink sending slot of the UE is a slot n, a time position at which the UE can receive a feedback after performing sending is a slot n+k. In this case, a minimum interval between the (expected) sending time position and the (expected) receiving time position in the transmission period may be set to k.

The (expected) receiving time position and the (expected) sending time position corresponding to the (expected) receiving time position in the transmission period correspond to the processing capability of the terminal.

For example, if a downlink receiving slot of the UE is a slot n, a time position at which the UE can send a feedback after performing receiving is a slot n+k. In this case, a minimum interval between the (expected) receiving time position and the (expected) sending time position in the transmission period may be set to k.

In this way, because the first expectation information corresponds to the processing capability of the terminal, reliability of communication of the terminal can be improved.

The following describes the carrier type information.

In this embodiment of this disclosure, the carrier type information may be used to determine a time granularity of each transmission time position in the transmission period. For example, the transmission time position is a slot, a symbol, or a subframe.

In a specific implementation, optionally, the carrier type information includes at least one of the following: a subcarrier spacing (SCS), a cyclic prefix (CP), cell identification information, cell group identification information, bandwidth part (BWP) identification information, and frequency identification information.

As can be learned from the foregoing content, the first information may include at least either of the first indication information and the carrier type information. Therefore, in an actual application, specific content included in the first information may include the following several cases:

In a first case, the first information includes the first indication information.

In a specific implementation, if the network-side device is configured with the carrier type information, or the carrier type information is prescribed by a protocol, the UE may not report the carrier type information.

In an implementation, the carrier type information configured by the network side or prescribed by the protocol may include at least one of the following:

a specific SCS (for example, SCS=15 kilohertz (kHz));
an SCS corresponding to a frequency point at which interference occurs (for example, an SCS corresponding to a frequency point f1 at which interference occurs on the UE is 15 kHz);
an SCS corresponding to a specific BWP in a cell in which interference occurs (for example, an SCS corresponding to an initial BWP in a cell 1 in which interference occurs on the UE is 15 kHz);
an SCS corresponding to a specific cell of a cell group including a cell in which interference occurs (for example, a cell 1 in which interference occurs on the UE belongs to an MCG, and a subcarrier spacing corresponding to a PCell of the MCG is 15 kHz); and
an SCS corresponding to a specific BWP of a specific cell of a cell group including a cell in which interference occurs (for example, a cell 1 in which interference occurs on the UE belongs to an MCG, and a subcarrier spacing corresponding to an initial BWP of a PCell of the MCG is 15 kHz).

The specific BWP may be at least one of the following: an initial (initial) BWP, a default BWP, and a currently activated BWP. The specific cell may be at least one of the following: a PCell and a PSCell.

In a second case, the first information includes the carrier type information.

In this case, the method may further include:
sending second indication information to the network-side device, where the second indication information is used to indicate the second expectation information, the second expectation information includes template information selected by the terminal, and the template information is used for determining the type of each transmission time position in a transmission period.

Further, the second expectation information may further include the expectation identification information of each transmission time position in the transmission period.

In a third case, the first information includes the first indication information and the carrier type information.

In this embodiment of this disclosure, optionally, in a case that the first information includes the first indication information, the sending first information to a network-side device includes:

sending the first information to the network-side device based on a preset rule, where the preset rule includes at least one of the following:
if the terminal indicates that a flexible time position is an expected receiving time position, it indicates that the terminal expects to set the flexible time position as a receiving time position, or does not expect to set the flexible time position as a sending time position;
if the terminal indicates that a flexible time position is a non-expected receiving time position, it indicates that the terminal does not expect to set the flexible time position as a receiving time position, or expects to set the flexible time position as a sending time position;
if the terminal indicates that a flexible time position is an expected sending time position, it indicates that the terminal expects to set the flexible time position as a sending time position, or does not expect to set the flexible time position as a receiving time position;
if the terminal indicates that a flexible time position is a non-expected sending time position, it indicates that the terminal does not expect to set the flexible time position as a sending time position, or expects to set the flexible time position as a receiving time position;
if the terminal indicates that a flexible time position is a non-expected position, it indicates that the terminal does not expect to set the flexible time position as a receiving time position or a sending time position; and
if the terminal indicates that a flexible time position is an expected position, it indicates that the terminal expects to set the flexible time position as a sending time position or a receiving time position.

The preset rule may be determined by the terminal, configured by the network side, or prescribed by a protocol. Specifically, the preset rule may be determined based on an actual requirement, and is not limited in this embodiment of this disclosure.

In this embodiment of this disclosure, in an implementation, the terminal may autonomously send the first information to the network-side device in the case of interference.

In another implementation, the terminal may alternatively send the first information to the network-side device based on an indication from the network-side device in the case of interference. In this implementation, optionally, before the sending first information to a network-side device in a case of interference, the method further includes:
receiving configuration information sent by the network-side device; and
the sending first information to a network-side device in a case of interference includes:
if the configuration information allows the terminal to send first information, sending the first information to the network-side device in the case of interference.

In the optional step, the configuration information may be used to allow or disallow sending the first information to the network-side device in the case of interference.

In a specific implementation, the configuration information may carry a bit, where a value "0" of the bit indicates that the terminal is allowed to send the first information to the network-side device in the case of interference, and a value "1" of the bit indicates the terminal is not allowed to send the first information to the network-side device in the case of interference.

The configuration information is specifically determined based on an actual situation. Therefore, in comparison with autonomously sending the first information to the network-side device by the terminal in the case of interference, a frequency of reporting the first information by the terminal can be reduced, and signaling overheads are reduced.

In the sending method in this embodiment, the terminal may report the first information to the network-side device in the case of interference. Therefore, the network-side device can adjust information related to a transmission time position based on the received first information, to reduce adverse impact of the interference, so that communication performance of the terminal can be improved.

FIG. 5 is a flowchart of an interference handling method according to an embodiment of this disclosure. The interference handling method in this embodiment of this disclosure is applied to a network-side device.

As shown in FIG. 5, the interference handling method may include the following steps.

Step 501: Receive first information sent by a terminal in a case of interference.

The first information includes at least one of the following:

first indication information, where the first indication information is used to indicate first expectation information autonomously determined by the terminal, and the first expectation information includes a type of each transmission time position in a transmission period; and carrier type information, where the carrier type information corresponds to the first expectation information, or the carrier type information corresponds to second expectation information selected and determined by the terminal.

Step 502: Adjust information related to a transmission time position based on the first information.

It should be understood that adjusted information related to a transmission time position matches the first information. Therefore, adverse impact of the interference can be reduced, or the interference can even be canceled, and further, communication performance of the terminal can be improved.

Optionally, the type of a transmission time position includes any one of the following: a sending time position, a receiving time position, and a flexible time position.

Optionally, transmission time positions of a same type in the transmission period are consecutive.

Optionally, the first expectation information further includes expectation identification information of each transmission time position in the transmission period.

Optionally, the first expectation information corresponds to a processing capability of the terminal.

Optionally, the expectation identification information is used to indicate either of the following:

indicating that the transmission time position is an expected transmission time position; and indicating that the transmission time position is a non-expected transmission time position.

Optionally, in a case that the transmission time position is a flexible time position, the expectation identification information is used to indicate any one of the following:

indicating that the transmission time position is an expected sending time position;

indicating that the transmission time position is a non-expected sending time position;

indicating that the transmission time position is an expected receiving time position; and indicating that the transmission time position is a non-expected receiving time position.

Optionally, the first expectation information is indicated by using a bitmap.

Optionally, the carrier type information includes at least one of the following: a subcarrier spacing SCS, a cyclic prefix CP, cell identification information, cell group identification information, bandwidth part BWP identification information, and frequency identification information.

Optionally, in a case that the first information does not include the first indication information, the method further includes:

receiving second indication information sent by the terminal device, where the second indication information is used to indicate the second expectation information, the second expectation information includes template information selected by the terminal, and the template information is used for determining the type of each transmission time position in a transmission period.

Optionally, in a case that the first information includes the first indication information, the adjusting information related to a transmission time position based on the first information includes:

adjusting the information related to a transmission time position based on a preset rule and the first information, where the preset rule includes at least one of the following:

if the terminal indicates that a flexible time position is an expected receiving time position, it indicates that the terminal expects to set the flexible time position as a receiving time position, or does not expect to set the flexible time position as a sending time position;

if the terminal indicates that a flexible time position is a non-expected receiving time position, it indicates that the terminal does not expect to set the flexible time position as a receiving time position, or expects to set the flexible time position as a sending time position;

if the terminal indicates that a flexible time position is an expected sending time position, it indicates that the terminal expects to set the flexible time position as a sending time position, or does not expect to set the flexible time position as a receiving time position;

if the terminal indicates that a flexible time position is a non-expected sending time position, it indicates that the terminal does not expect to set the flexible time position as a sending time position, or expects to set the flexible time position as a receiving time position;

if the terminal indicates that a flexible time position is a non-expected position, it indicates that the terminal does not expect to set the flexible time position as a receiving time position or a sending time position; and if the terminal indicates that a flexible time position is an expected position, it indicates that the terminal expects to set the flexible time position as a sending time position or a receiving time position.

Optionally, before the receiving first information sent by a terminal in a case of interference, the method further includes:

sending configuration information to the terminal, where the configuration information allows the terminal to send first information.

Optionally, the information related to a transmission time position includes at least one of the following: a type of the transmission time position and a time granularity of the transmission time position.

In the interference handling method in this embodiment, the network-side device may adjust the information related to a transmission time position based on the received first information, to reduce adverse impact of the interference, so that communication performance of the terminal can be improved.

It should be noted that this embodiment serves as an implementation of the network-side device corresponding to the foregoing method embodiment. Therefore, reference may be made to the related description in the foregoing method embodiment, and a same beneficial effect can be achieved. To avoid repetition, details are not described herein again.

It should be noted that various optional implementations described in this embodiment of this disclosure may be implemented in combination or may be implemented independently. This is not limited in this embodiment of this disclosure.

For ease of understanding, the following uses an example for description.

Step 1: A network side configures an indication about whether to allow UE to report sending and receiving time position information desired by the UE in a case of interference (for example, a value "0" of one bit indicates that reporting is allowed, and a value "1" indicates that reporting is not allowed).

Step 2: The UE reports the sending and receiving time position information desired by the UE to the network side in the case of interference, where the sending and receiving time position information includes at least one of the following:

uplink sending time position information and/or downlink receiving time position information;

a subcarrier spacing corresponding to the time position information (for example, SCS=15 kHz);

a cyclic prefix corresponding to the time position information;

a cell identity (for example, a PCell or an SCell1) corresponding to the time position information;

a cell group identity (for example, an MCG or an SCG) corresponding to the time position information; and a BWP identifier (for example, a BWP 1) corresponding to the time position information.

The "time position information" includes any one of the following:

Method 1: Configuration information of uplink and downlink slot and symbol positions, and desired uplink sending positions and/or downlink receiving positions.

As shown in FIG. 6, for a "TDD-UL-DL-Pattern" bitmap of a 10 ms period, first four slots are downlink slots, and last four slots are uplink slots, and the middle two slots are flexible slots. The 10 bits in total identify a number position of each slot (for example, a first bit identifies a first slot, and so on).

The UE may identify, by setting a value of a bit to "0", an undesired receiving or sending position, and identify, by setting a value of a bit to "1", a desired receiving or sending position. For a flexible slot, if the UE indicates "undesired" by using "0", it may indicate that the UE neither desires to perform receiving in the flexible slot or nor desires to perform sending in the flexible slot. For a flexible slot, if the UE indicates "desired" by using "1", it may indicate that the UE desires to perform both receiving and sending in the flexible slot.

In FIG. 6, UL represents a sending time position, DL represents a receiving time position, and F represents a flexible time position.

Method 2: A bitmap identifies time positions, to identify specific time positions as desired uplink sending or downlink receiving or "uplink and downlink", or identify specific time positions as undesired uplink sending or downlink receiving or "uplink and downlink".

As shown in FIG. 7, for a bitmap of a 10 ms period, 10 bits in total identify 10 slot positions (for example, a first bit identifies a first slot, and so on). In addition, for each time position, the UE may identify whether the time position corresponds to uplink or downlink. The UE may also identify a specific slot as neither desired downlink nor desired uplink (or both desired downlink and desired uplink).

In FIG. 7, UL represents a sending time position, and DL represents a receiving time position.

In addition, for the method 1 or the method 2, the following rule may be configured by the network side or prescribed by a protocol:

if a desired downlink receiving position is a "flexible slot or symbol" position, it indicates that the UE desires to set the position as downlink, and does not desire to set the position as uplink;

if an undesired downlink receiving position is a "flexible slot or symbol" position, it indicates that the UE does not desire to set the position as downlink, but desires to set the position as uplink;

if a desired uplink sending position is a "flexible slot or symbol" position, it indicates that the UE desires to set the position as uplink, and does not desire to set the position as downlink;

if an undesired uplink sending position is a "flexible slot or symbol" position, it indicates that the UE does not desire to set the position as uplink, but desires to set the position as downlink;

if a "flexible slot or symbol" position is indicated as an undesired position, but not indicated as uplink or downlink, it indicates that the UE desires neither downlink nor uplink at the "flexible slot or symbol" position; and if a "flexible slot or symbol" position is indicated as a desired position, but not indicated as uplink or downlink, it indicates that the UE desires to freely set the "flexible slot or symbol" as uplink or downlink.

In addition, the "subcarrier spacing corresponding to the time position information", the "cyclic prefix corresponding to the time position information", the "cell identity corresponding to the time position information", the "cell group identity corresponding to the time position information", or the "BWP identifier corresponding to the time position information" may be a specific value configured by the network side or prescribed by a protocol (for example, the subcarrier spacing is 15 kHz). Therefore, the UE does not need to additionally report the information. The "specific value configured by the network side or prescribed by the protocol" includes any one of the following:

a specific subcarrier spacing (for example, SCS=15 kHz);

a subcarrier spacing corresponding to a frequency point at which interference occurs (for example, a subcarrier spacing corresponding to a frequency point f1 at which interference occurs on the UE is 15 kHz);

a subcarrier spacing corresponding to a specific BWP (for example, an initial BWP, a default BWP, or a currently activated BWP) in a cell in which interference occurs (for example, a subcarrier spacing corresponding to an initial BWP in a cell 1 in which interference occurs on the UE is 15 kHz);

a subcarrier spacing corresponding to a specific cell (for example, a primary cell PCell or a primary secondary cell PSCell) of a cell group including a cell in which interference occurs (for example, a cell 1 in which interference occurs on the UE belongs to an MCG, and a subcarrier spacing corresponding to a PCell of the MCG is 15 kHz); and a subcarrier spacing corresponding to a specific BWP (an initial BWP, a default BWP, or a currently activated BWP in a specific cell) in a specific cell (for example, a primary cell PCell or a primary secondary cell PSCell) of a cell group including a cell in which interference occurs (for example, a cell 1 in which interference occurs on the UE belongs to an MCG, and a subcarrier spacing corresponding to an initial BWP in a PCell of the MCG is 15 kHz).

Step 3: The network side performs a corresponding adjustment based on interference assistance information reported by the UE during uplink sending or downlink receiving (for example, changes uplink and downlink slot and symbol position configuration information based on a desire of the UE).

In this embodiment of this disclosure, the desired time domain sending and receiving information that the UE may report specifies corresponding carrier type information; and a specific desired time domain sending and receiving bitmap is designed to correspond to 5G uplink and downlink slot and symbol position configuration information. Therefore, the desired uplink sending and downlink receiving time positions reported by the UE can be made consistent with those understood by the network side, and a loss of data during sending and receiving is avoided.

Figure 8:
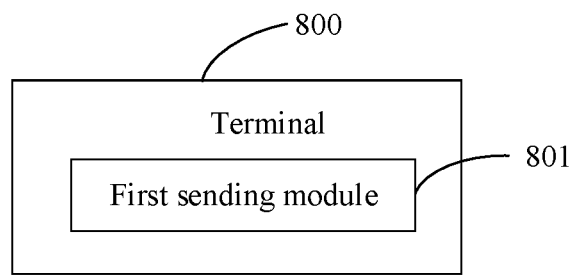
FIG. 8 is a first structural diagram of a terminal according to an embodiment of this disclosure.

FIG. 8 is a first structural diagram of a terminal according to an embodiment of this disclosure. As shown in FIG. 8, the terminal 800 includes:

a first sending module 801, configured to send first information to a network-side device in a case of interference, where the first information includes at least one of the following:

first indication information, where the first indication information is used to indicate first expectation information autonomously determined by the terminal, and the first expectation information includes a type of each transmission time position in a transmission period; and carrier type information, where the carrier type information corresponds to the first expectation information, or the carrier type information corresponds to second expectation information selected and determined by the terminal.

Optionally, the type of a transmission time position includes any one of the following: a sending time position, a receiving time position, and a flexible time position.

Optionally, transmission time positions of a same type in the transmission period are consecutive.

Optionally, the first expectation information further includes expectation identification information of each transmission time position in the transmission period.

Optionally, the first expectation information corresponds to a processing capability of the terminal.

Optionally, the expectation identification information is used to indicate either of the following:

indicating that the transmission time position is an expected transmission time position; and indicating that the transmission time position is a non-expected transmission time position.

Optionally, in a case that the transmission time position is a flexible time position, the expectation identification information is used to indicate any one of the following:

indicating that the transmission time position is an expected sending time position;

indicating that the transmission time position is a non-expected sending time position;

indicating that the transmission time position is an expected receiving time position; and indicating that the transmission time position is a non-expected receiving time position.

Optionally, the first expectation information is indicated by using a bitmap.

Optionally, the carrier type information includes at least one of the following: a subcarrier spacing SCS, a cyclic prefix CP, cell identification information, cell group identification information, bandwidth part BWP identification information, and frequency identification information.

Optionally, in a case that the first information does not include the first indication information, the terminal 800 further includes:

a second sending module, configured to send second indication information to the network-side device, where the second indication information is used to indicate the second expectation information, the second expectation information includes template information selected by the terminal, and the template information is used for determining the type of each transmission time position in a transmission period.

Optionally, the first sending module 801 is specifically configured to:

send the first information to the network-side device based on a preset rule, where the preset rule includes at least one of the following:

if the terminal indicates that a flexible time position is an expected receiving time position, it indicates that the terminal expects to set the flexible time position as a receiving time position, or does not expect to set the flexible time position as a sending time position;

if the terminal indicates that a flexible time position is a non-expected receiving time position, it indicates that the terminal does not expect to set the flexible time position as a receiving time position, or expects to set the flexible time position as a sending time position;

if the terminal indicates that a flexible time position is an expected sending time position, it indicates that the terminal expects to set the flexible time position as a sending time position, or does not expect to set the flexible time position as a receiving time position;

if the terminal indicates that a flexible time position is a non-expected sending time position, it indicates that the terminal does not expect to set the flexible time position as a sending time position, or expects to set the flexible time position as a receiving time position;

if the terminal indicates that a flexible time position is a non-expected position, it indicates that the terminal does not expect to set the flexible time position as a receiving time position or a sending time position; and if the terminal indicates that a flexible time position is an expected position, it indicates that the terminal expects to set the flexible time position as a sending time position or a receiving time position.

Optionally, the terminal further includes:

a first receiving module, configured to: before the first information is sent to the network-side device in the case of interference, receive configuration information sent by the network-side device; and the first sending module 801 is specifically configured to:

if the configuration information allows the terminal to send first information, send the first information to the network-side device in the case of interference.

The terminal 800 can implement the processes that can be implemented by a terminal in the method embodiment of this disclosure, with the same beneficial effect achieved. To avoid repetition, details are not described herein again.

Figure 9:
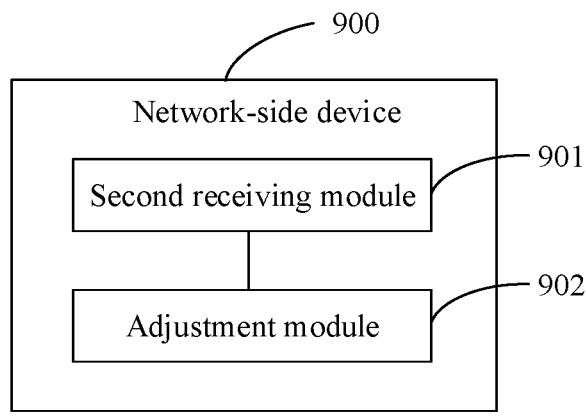
FIG. 9 is a first structural diagram of a network-side device according to an embodiment of this disclosure.

FIG. 9 is a first structural diagram of a network-side device according to an embodiment of this disclosure. As shown in FIG. 9, the network-side device 900 includes:

a second receiving module 901, configured to receive first information sent by a terminal in a case of interference; and an adjustment module 902, configured to adjust information related to a transmission time position based on the first information, where the first information includes at least one of the following:

first indication information, where the first indication information is used to indicate first expectation information autonomously determined by the terminal, and the first expectation information includes a type of each transmission time position in a transmission period; and carrier type information, where the carrier type information corresponds to the first expectation information, or the carrier type information corresponds to second expectation information selected and determined by the terminal.

Optionally, the type of a transmission time position includes any one of the following: a sending time position, a receiving time position, and a flexible time position.

Optionally, transmission time positions of a same type in the transmission period are consecutive.

Optionally, the first expectation information further includes expectation identification information of each transmission time position in the transmission period.

Optionally, the first expectation information corresponds to a processing capability of the terminal.

Optionally, the expectation identification information is used to indicate either of the following:

indicating that the transmission time position is an expected transmission time position; and indicating that the transmission time position is a non-expected transmission time position.

Optionally, in a case that the transmission time position is a flexible time position, the expectation identification information is used to indicate any one of the following:

indicating that the transmission time position is an expected sending time position;

indicating that the transmission time position is a non-expected sending time position;

indicating that the transmission time position is an expected receiving time position; and indicating that the transmission time position is a non-expected receiving time position.

Optionally, the first expectation information is indicated by using a bitmap.

Optionally, the carrier type information includes at least one of the following: a subcarrier spacing SCS, a cyclic prefix CP, cell identification information, cell group identification information, bandwidth part BWP identification information, and frequency identification information.

Optionally, in a case that the first information does not include the first indication information, the network-side device 900 further includes:

a third receiving module, configured to receive second indication information sent by the terminal device, where the second indication information is used to indicate the second expectation information, the second expectation information includes template information selected by the terminal, and the template information is used for determining the type of each transmission time position in a transmission period.

Optionally, in a case that the first information includes the first indication information, the adjustment module 902 is specifically configured to:

adjust the information related to a transmission time position based on a preset rule and the first information, where the preset rule includes at least one of the following:

if the terminal indicates that a flexible time position is an expected receiving time position, it indicates that the terminal expects to set the flexible time position as a receiving time position, or does not expect to set the flexible time position as a sending time position;

if the terminal indicates that a flexible time position is a non-expected receiving time position, it indicates that the terminal does not expect to set the flexible time position as a receiving time position, or expects to set the flexible time position as a sending time position;

if the terminal indicates that a flexible time position is an expected sending time position, it indicates that the terminal expects to set the flexible time position as a sending time position, or does not expect to set the flexible time position as a receiving time position;

if the terminal indicates that a flexible time position is a non-expected sending time position, it indicates that the terminal does not expect to set the flexible time position as a sending time position, or expects to set the flexible time position as a receiving time position;

if the terminal indicates that a flexible time position is a non-expected position, it indicates that the terminal does not expect to set the flexible time position as a receiving time position or a sending time position; and if the terminal indicates that a flexible time position is an expected position, it indicates that the terminal expects to set the flexible time position as a sending time position or a receiving time position.

Optionally, the network-side device 900 further includes:

a third sending module, configured to: before the first information sent by the terminal in the case of interference is received, send configuration information to the terminal, where the configuration information allows the terminal to send first information.

Optionally, the information related to a transmission time position includes at least one of the following: a type of the transmission time position and a time granularity of the transmission time position.

The network-side device 900 can implement the processes that can be implemented by a network-side device in the method embodiments of this disclosure, with the same beneficial effect achieved. To avoid repetition, details are not described herein again.

Figure 10:
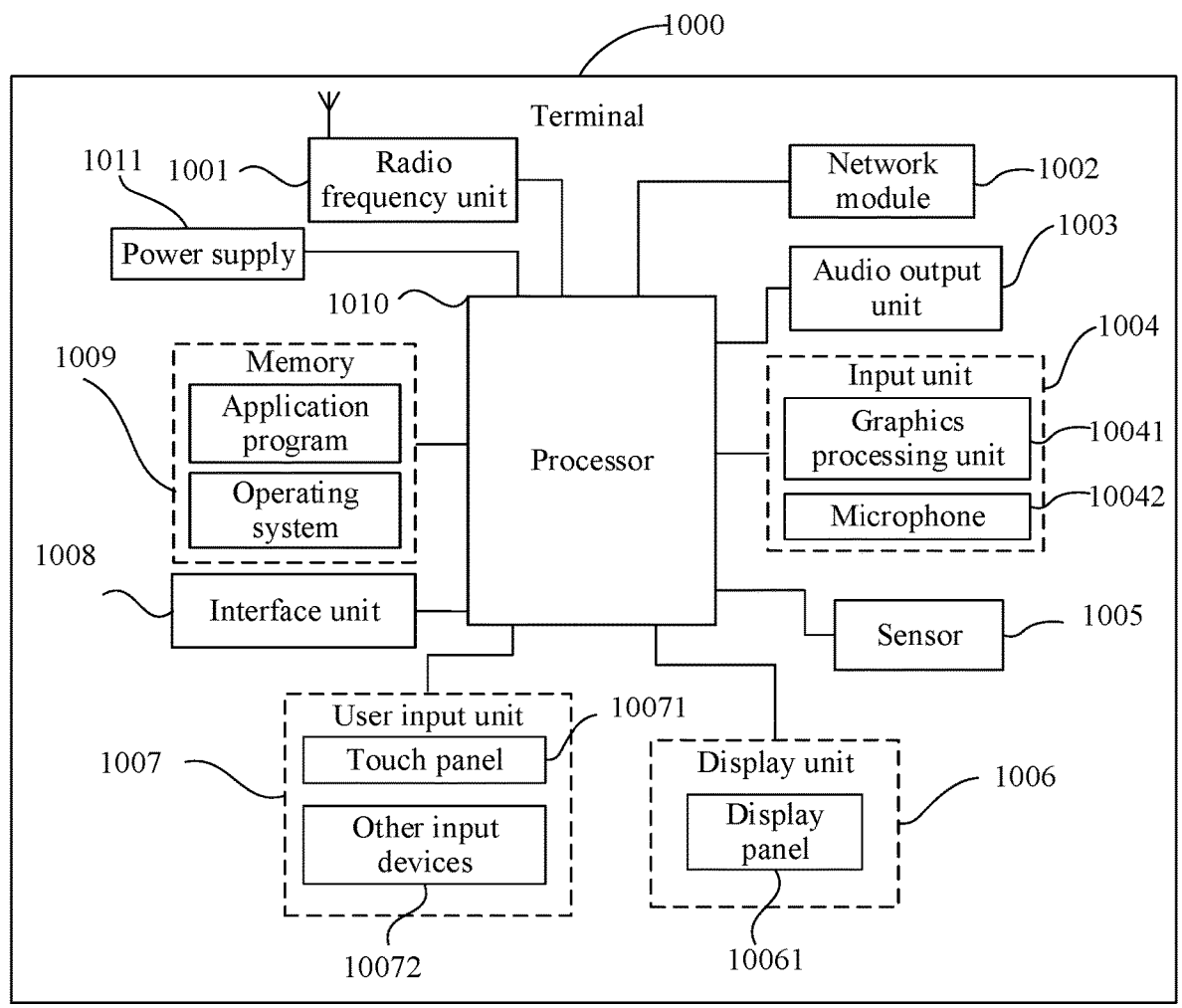
FIG. 10 is a second structural diagram of a terminal according to an embodiment of this disclosure.

FIG. 10 is a second structural diagram of a terminal according to an embodiment of this disclosure. The terminal may be a schematic diagram of a hardware structure of a terminal that implements various embodiments of this disclosure. Referring to FIG. 10, the terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that the structure of the terminal shown in FIG. 10 does not constitute a limitation on the terminal. A quantity of components included in the terminal may be greater or less than that shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 1001 is configured to:
send first information to a network-side device in a case of interference, where the first information includes at least one of the following:
first indication information, where the first indication information is used to indicate first expectation information autonomously determined by the terminal, and the first expectation information includes a type of each transmission time position in a transmission period; and
carrier type information, where the carrier type information corresponds to the first expectation information, or the carrier type information corresponds to second expectation information selected and determined by the terminal.

Optionally, the type of a transmission time position includes any one of the following: a sending time position, a receiving time position, and a flexible time position.

Optionally, transmission time positions of a same type in the transmission period are consecutive.

Optionally, the first expectation information further includes expectation identification information of each transmission time position in the transmission period.

Optionally, the first expectation information corresponds to a processing capability of the terminal.

Optionally, the expectation identification information is used to indicate either of the following:
indicating that the transmission time position is an expected transmission time position; and
indicating that the transmission time position is a non-expected transmission time position.

Optionally, in a case that the transmission time position is a flexible time position, the expectation identification information is used to indicate any one of the following:
indicating that the transmission time position is an expected sending time position;
indicating that the transmission time position is a non-expected sending time position;
indicating that the transmission time position is an expected receiving time position; and
indicating that the transmission time position is a non-expected receiving time position.

Optionally, the first expectation information is indicated by using a bitmap.

Optionally, the carrier type information includes at least one of the following: a subcarrier spacing SCS, a cyclic prefix CP, cell identification information, cell group identification information, bandwidth part BWP identification information, and frequency identification information.

Optionally, in a case that the first information does not include the first indication information, the radio frequency unit 1001 is further configured to:
send second indication information to the network-side device, where the second indication information is used to indicate the second expectation information, the second expectation information includes template information selected by the terminal, and the template information is used for determining the type of each transmission time position in a transmission period.

Optionally, in a case that the first information includes the first indication information, the radio frequency unit 1001 is further configured to:
send the first information to the network-side device based on a preset rule, where the preset rule includes at least one of the following:
if the terminal indicates that a flexible time position is an expected receiving time position, it indicates that the terminal expects to set the flexible time position as a receiving time position, or does not expect to set the flexible time position as a sending time position;
if the terminal indicates that a flexible time position is a non-expected receiving time position, it indicates that the terminal does not expect to set the flexible time position as a receiving time position, or expects to set the flexible time position as a sending time position;
if the terminal indicates that a flexible time position is an expected sending time position, it indicates that the terminal expects to set the flexible time position as a sending time position, or does not expect to set the flexible time position as a receiving time position;
if the terminal indicates that a flexible time position is a non-expected sending time position, it indicates that the terminal does not expect to set the flexible time position as a sending time position, or expects to set the flexible time position as a receiving time position;
if the terminal indicates that a flexible time position is a non-expected position, it indicates that the terminal does not expect to set the flexible time position as a receiving time position or a sending time position; and
if the terminal indicates that a flexible time position is an expected position, it indicates that the terminal expects to set the flexible time position as a sending time position or a receiving time position.

Optionally, the radio frequency unit 1001 is further configured to:
receive configuration information sent by the network-side device; and
if the configuration information allows the terminal to send first information, send the first information to the network-side device in the case of interference.

It should be noted that the terminal 1000 in this embodiment can implement the processes of method embodiments of this disclosure, with the same beneficial effect achieved. To avoid repetition, details are not described herein again.

It should be understood that in this embodiment of this disclosure, the radio frequency unit 1001 may be configured to receive and send signals in an information reception or transmission or call process. Specifically, after receiving data in a receiving time position from a base station, the radio frequency unit 1001 sends the data to the processor 1010 for processing, and in addition, sends data in a sending time position to the base station. Generally, the radio frequency unit 1001 includes but is not limited to an antenna, at least one amplifier, a transceiver, a coupler, a low noise amplifier, a duplexer, and the like. In addition, the radio frequency unit 1001 may further communicate with a network and another device through a wireless communications system.

The terminal provides wireless broadband Internet access for a user by using the network module 1002, for example, helps the user send and receive e-mails, browse web pages, and access streaming media.

The audio output unit 1003 may convert audio data received by the radio frequency unit 1001 or the network module 1002 or stored in the memory 1009 into an audio signal, and output the audio signal as a sound. In addition, the audio output unit 1003 may further provide an audio output (for example, a call signal received sound or a message received sound) related to a specific function performed by the terminal 1000. The audio output unit 1003 includes a speaker, a buzzer, a telephone receiver, and the like.

The input unit 1004 is configured to receive an audio or video signal. The input unit 1004 may include a graphics processing unit (GPU) 10041 and a microphone 10042. The graphics processing unit 10041 processes image data of a still picture or a video obtained by an image capture apparatus (for example, a camera) in an image capture mode or a video capture mode. A processed image frame may be displayed on the display unit 1006. An image frame processed by the graphics processing unit 10041 may be stored in the memory 1009 (or another storage medium) or sent by the radio frequency unit 1001 or the network module 1002. The microphone 10042 can receive a sound and can process the sound into audio data. The processed audio data can be converted into a format output that can be sent to a mobile communication base station through the radio frequency unit 1001 in a telephone call mode.

The terminal 1000 further includes at least one sensor 1005, for example, an optical sensor, a motion sensor, and another sensor. Specifically, the optical sensor includes an ambient light sensor and a proximity sensor. The ambient light sensor may adjust luminance of a display panel 10061 based on brightness of ambient light. The proximity sensor may turn off the display panel 10061 and/or backlight when the terminal 1000 moves to an ear. As a type of motion sensor, an accelerometer sensor can detect magnitudes of accelerations in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 1005 may further include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information input by the user or information provided for the user. The display unit 1006 may include the display panel 10061. The display panel 10061 may be configured in a form of a liquid crystal display (LCD), an organic light-emitting diode (OLED), or the like.

The user input unit 1007 may be configured to receive input digit or character information, and generate a key signal input related to a user setting and function control of the terminal. Specifically, the user input unit 1007 includes a touch panel 10071 and other input devices 10072. The touch panel 10071, also referred to as a touchscreen, may capture a touch operation performed by the user on or near the touch panel (for example, an operation performed by the user on the touch panel 10071 or near the touch panel 10071 by using any appropriate object or accessory such as a finger or a stylus). The touch panel 10071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 1010, and receives and executes a command sent by the processor 1010. In addition, the touch panel 10071 may be implemented in a plurality of forms, for example, a resistive, capacitive, infrared, or surface acoustic wave touch panel. The user input unit 1007 may further include the other input devices 10072 in addition to the touch panel 10071. Specifically, the other input devices 10072 may include but are not limited to a physical keyboard, a function key (such as a volume control key or a power on/off key), a trackball, a mouse, a joystick, and the like. Details are not described herein.

Further, the touch panel 10071 may cover the display panel 10061. After the touch panel 10071 detects a touch operation on or near the touch panel, the touch panel 10071 transmits the touch operation to the processor 1010 to determine a type of a touch event. Then the processor 1010 provides a corresponding visual output on the display panel 10061 based on the type of the touch event. Although the touch panel 10071 and the display panel 10061 are used as two separate components to implement input and output functions of the terminal in FIG. 10, the touch panel 10071 and the display panel 10061 may be integrated to implement the input and output functions of the terminal in some embodiments. This is not specifically limited herein.

The interface unit 1008 is an interface for connecting an external apparatus to the terminal 1000. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 1008 may be configured to receive an input (for example, data information or power) from an external apparatus, and transmit the received input to one or more components in the terminal 1000, or may be configured to transmit data between the terminal 1000 and an external apparatus.

The memory 1009 may be configured to store a software program and various data. The memory 1009 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1009 may include a high-speed random access memory, or may include a non-volatile memory, for example, at least one magnetic disk storage device, a flash memory, or other non-volatile solid-state storage devices.

The processor 1010 is a control center of the terminal. The processor 1010 uses various interfaces and lines to connect all parts of the entire terminal, and performs various functions and data processing of the terminal by running or executing the software program and/or module stored in the memory 1009 and invoking data stored in the memory 1009, thereby performing overall monitoring on the terminal. The processor 1010 may include one or more processing units. Optionally, the processor 1010 may integrate an application processor and a modem processor. The application processor mainly processes the operating system, a user interface, an application program, and the like. The modem processor mainly processes wireless communication. It may be understood that the modem processor may alternatively not be integrated into the processor 1010.

The terminal 1000 may further include the power supply 1011 (such as a battery) supplying power to each component. Optionally, the power supply 1011 may be logically connected to the processor 1010 by using a power management system, so that functions such as charge and discharge management and power consumption management are implemented by using the power management system.

In addition, the terminal 1000 includes some functional modules that are not illustrated. Details are not described herein.

Optionally, an embodiment of this disclosure further provides a terminal, including a processor 1010, a memory 1009, and a computer program stored in the memory 1009 and capable of running on the processor 1010. When the computer program is executed by the processor 1010, the processes of the foregoing sending method embodiments can be implemented, with the same technical effect achieved. To avoid repetition, details are not described herein again.

Figure 11:
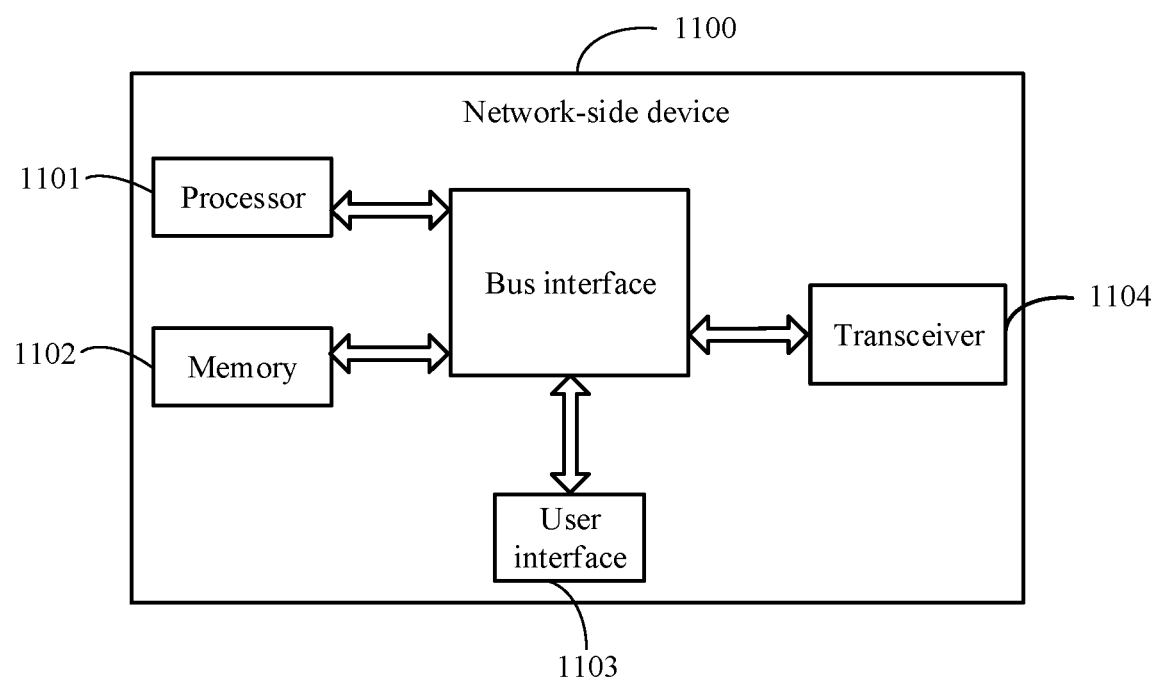
FIG. 11 is a second structural diagram of a network-side device according to an embodiment of this disclosure.

FIG. 11 is a second structural diagram of a network-side device according to an embodiment of this disclosure. As shown in FIG. 11, the network-side device 1100 includes a processor 1101, a memory 1102, a user interface 1103, a transceiver 1104, and a bus interface.

In this embodiment of this disclosure, the network-side device 1100 further includes a computer program stored in the memory 1102 and capable of running on the processor 1101. When the computer program is executed by the processor 1101, the following steps are implemented:
  receiving, by using the transceiver 1104, first information sent by a terminal in a case of interference; and
  adjusting information related to a transmission time position based on the first information, where
  the first information includes at least one of the following:
  first indication information, where the first indication information is used to indicate first expectation information autonomously determined by the terminal, and the first expectation information includes a type of each transmission time position in a transmission period; and
  carrier type information, where the carrier type information corresponds to the first expectation information, or the carrier type information corresponds to second expectation information selected and determined by the terminal.

In FIG. 11, a bus architecture may include any quantity of interconnect buses and bridges, specifically for interconnecting various circuits of one or more processors represented by the processor 1101 and a memory represented by the memory 1102. The bus architecture may further interconnect various other circuits such as a peripheral device, a voltage regulator, and a power management circuit. These are all well known in the art, and therefore are not further described in this specification. The bus interface provides an interface. The transceiver 1104 may be a plurality of components, that is, the transceiver 1104 includes a transmitter and a receiver, and provides a unit for communicating with various other apparatuses on a transmission medium. For different user equipment, the user interface 1109 may also be an interface for externally or internally connecting a required device, and the connected device includes but is not limited to a mini keyboard, a display, a speaker, a microphone, a joystick, or the like.

The processor 1101 is responsible for bus architecture management and general processing. The memory 1102 may store data for use when the processor 2601 performs an operation.

Optionally, when the computer program is executed by the processor 1101, the following steps can be further implemented:

Optionally, the type of a transmission time position includes any one of the following: a sending time position, a receiving time position, and a flexible time position.

Optionally, transmission time positions of a same type in the transmission period are consecutive.

Optionally, the first expectation information further includes expectation identification information of each transmission time position in the transmission period.

Optionally, the first expectation information corresponds to a processing capability of the terminal.

Optionally, the expectation identification information is used to indicate either of the following:
  indicating that the transmission time position is an expected transmission time position; and
  indicating that the transmission time position is a non-expected transmission time position.

Optionally, in a case that the transmission time position is a flexible time position, the expectation identification information is used to indicate any one of the following:
  indicating that the transmission time position is an expected sending time position;
  indicating that the transmission time position is a non-expected sending time position;
  indicating that the transmission time position is an expected receiving time position; and
  indicating that the transmission time position is a non-expected receiving time position.

Optionally, the first expectation information is indicated by using a bitmap.

Optionally, the carrier type information includes at least one of the following: a subcarrier spacing SCS, a cyclic prefix CP, cell identification information, cell group identification information, bandwidth part BWP identification information, and frequency identification information.

Optionally, in a case that the first information does not include the first indication information, when the computer program is executed by the processor 1101, the following step may be further implemented:
  receiving, by using the transceiver 1104, second indication information sent by the terminal device, where the second indication information is used to indicate the second expectation information, the second expectation information includes template information selected by the terminal, and the template information is used for determining the type of each transmission time position in a transmission period.

Optionally, in a case that the first information includes the first indication information, when the computer program is executed by the processor 1101, the following step may be further implemented:
  adjusting the information related to a transmission time position based on a preset rule and the first information, where the preset rule includes at least one of the following:
  if the terminal indicates that a flexible time position is an expected receiving time position, it indicates that the terminal expects to set the flexible time position as a receiving time position, or does not expect to set the flexible time position as a sending time position;
  if the terminal indicates that a flexible time position is a non-expected receiving time position, it indicates that the terminal does not expect to set the flexible time position as a receiving time position, or expects to set the flexible time position as a sending time position;
  if the terminal indicates that a flexible time position is an expected sending time position, it indicates that the terminal expects to set the flexible time position as a sending time position, or does not expect to set the flexible time position as a receiving time position;
  if the terminal indicates that a flexible time position is a non-expected sending time position, it indicates that the terminal does not expect to set the flexible time position as a sending time position, or expects to set the flexible time position as a receiving time position;

if the terminal indicates that a flexible time position is a non-expected position, it indicates that the terminal does not expect to set the flexible time position as a receiving time position or a sending time position; and if the terminal indicates that a flexible time position is an expected position, it indicates that the terminal expects to set the flexible time position as a sending time position or a receiving time position.

Optionally, when the computer program is executed by the processor 1101, the following steps can be further implemented:

sending configuration information to the terminal by using the transceiver 1104, where the configuration information allows the terminal to send first information.

Optionally, the information related to a transmission time position includes at least one of the following: a type of the transmission time position and a time granularity of the transmission time position.

The network-side device 1100 can implement the processes implemented by a network-side device in the foregoing method embodiment. To avoid repetition, details are not described herein again.

An embodiment of this disclosure further provides a computer-readable storage medium, where a computer program is stored in the computer-readable storage medium. When the computer program is executed by a processor, the processes of the sending method embodiment or the interference handling method embodiment are implemented, with the same technical effect achieved. To avoid repetition, details are not described herein again. The computer-readable storage medium is, for example, a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A sending method, applied to a terminal and comprising:

sending first information to a network-side device in a case of interference, wherein the first information comprises at least one of the following:

first indication information, wherein the first indication information is used to indicate first expectation information autonomously determined by the terminal, and the first expectation information comprises a type of each transmission time position in a transmission period; and carrier type information, wherein the carrier type information corresponds to the first expectation information, or the carrier type information corresponds to second expectation information selected and determined by the terminal;

wherein in a case that the first information does not comprise the first indication information, the method further comprises:

sending second indication information to the network-side device, wherein the second indication information is used to indicate the second expectation information, the second expectation information comprises template information selected by the terminal, and the template information is used for determining the type of each transmission time position in a transmission period;

or, wherein in a case that the first information comprises the first indication information, the sending first information to a network-side device comprises:

sending the first information to the network-side device based on a preset rule, wherein the preset rule comprises at least one of the following:

if the terminal indicates that a flexible time position is an expected receiving time position, it indicates that the terminal expects to set the flexible time position as a receiving time position, or does not expect to set the flexible time position as a sending time position;

if the terminal indicates that a flexible time position is a non-expected receiving time position, it indicates that the terminal does not expect to set the flexible time position as a receiving time position, or expects to set the flexible time position as a sending time position;

if the terminal indicates that a flexible time position is an expected sending time position, it indicates that the terminal expects to set the flexible time position as a sending time position, or does not expect to set the flexible time position as a receiving time position;

if the terminal indicates that a flexible time position is a non-expected sending time position, it indicates that the terminal does not expect to set the flexible time position as a sending time position, or expects to set the flexible time position as a receiving time position;

if the terminal indicates that a flexible time position is a non-expected position, it indicates that the terminal does not expect to set the flexible time position as a receiving time position or a sending time position; and if the terminal indicates that a flexible time position is an expected position, it indicates that the terminal expects to set the flexible time position as a sending time position or a receiving time position.

2. The method according to claim 1, wherein the type of a transmission time position comprises any one of the following: a sending time position, a receiving time position, and a flexible time position.

3. The method according to claim 2, wherein transmission time positions of a same type in the transmission period are consecutive.

4. The method according to claim 1, wherein the first expectation information further comprises expectation identification information of each transmission time position in the transmission period;
wherein the expectation identification information is used to indicate either of the following:
indicating that the transmission time position is an expected transmission time position; and
indicating that the transmission time position is a non-expected transmission time position.

5. The method according to claim 4, wherein in a case that the transmission time position is a flexible time position, the expectation identification information is used to indicate any one of the following:
indicating that the transmission time position is an expected sending time position;
indicating that the transmission time position is a non-expected sending time position;
indicating that the transmission time position is an expected receiving time position; and
indicating that the transmission time position is a non-expected receiving time position.

6. The method according to claim 1, wherein the first expectation information is indicated by a bitmap.

7. The method according to claim 1, wherein the carrier type information comprises at least one of the following: a subcarrier spacing SCS, a cyclic prefix CP, cell identification information, cell group identification information, bandwidth part BWP identification information, and frequency identification information.

8. The method according to claim 1, wherein before the sending first information to a network-side device in a case of interference, the method further comprises:
receiving configuration information sent by the network-side device; and
the sending first information to a network-side device in a case of interference comprises:
if the configuration information allows the terminal to send first information, sending the first information to the network-side device in the case of interference.

9. An interference handling method, applied to a network-side device and comprising:
receiving first information sent by a terminal in a case of interference; and
adjusting information related to a transmission time position based on the first information, wherein the first information comprises at least one of the following:
first indication information, wherein the first indication information is used to indicate first expectation information autonomously determined by the terminal, and the first expectation information comprises a type of each transmission time position in a transmission period; and
carrier type information, wherein the carrier type information corresponds to the first expectation information, or the carrier type information corresponds to second expectation information selected and determined by the terminal;
wherein in a case that the first information does not comprise the first indication information, the method further comprises:
receiving second indication information sent by the terminal device, wherein the second indication information is used to indicate the second expectation information, the second expectation information comprises template information selected by the terminal, and the template information is used for determining the type of each transmission time position in a transmission period;
or,
wherein in a case that the first information comprises the first indication information, the adjusting information related to a transmission time position based on the first information comprises:
adjusting the information related to a transmission time position based on a preset rule and the first information, wherein the preset rule comprises at least one of the following:
if the terminal indicates that a flexible time position is an expected receiving time position, it indicates that the terminal expects to set the flexible time position as a receiving time position, or does not expect to set the flexible time position as a sending time position;
if the terminal indicates that a flexible time position is a non-expected receiving time position, it indicates that the terminal does not expect to set the flexible time position as a receiving time position, or expects to set the flexible time position as a sending time position;
if the terminal indicates that a flexible time position is an expected sending time position, it indicates that the terminal expects to set the flexible time position as a sending time position, or does not expect to set the flexible time position as a receiving time position;
if the terminal indicates that a flexible time position is a non-expected sending time position, it indicates that the terminal does not expect to set the flexible time position as a sending time position, or expects to set the flexible time position as a receiving time position;
if the terminal indicates that a flexible time position is a non-expected position, it indicates that the terminal does not expect to set the flexible time position as a receiving time position or a sending time position; and
if the terminal indicates that a flexible time position is an expected position, it indicates that the terminal expects to set the flexible time position as a sending time position or a receiving time position.

10. A terminal, comprising a processor, a memory, and a computer program stored in the memory and capable of running on the processor, wherein when the computer program is executed by the processor, the following steps are implemented:
sending first information to a network-side device in a case of interference, wherein the first information comprises at least one of the following:
first indication information, wherein the first indication information is used to indicate first expectation information autonomously determined by the terminal, and the first expectation information comprises a type of each transmission time position in a transmission period; and
carrier type information, wherein the carrier type information corresponds to the first expectation information, or the carrier type information corresponds to second expectation information selected and determined by the terminal;

wherein in a case that the first information does not comprise the first indication information, the method further comprises:

sending second indication information to the network-side device, wherein the second indication information is used to indicate the second expectation information, the second expectation information comprises template information selected by the terminal, and the template information is used for determining the type of each transmission time position in a transmission period;

or, wherein in a case that the first information comprises the first indication information, the sending first information to a network-side device comprises:

sending the first information to the network-side device based on a preset rule, wherein the preset rule comprises at least one of the following:

if the terminal indicates that a flexible time position is an expected receiving time position, it indicates that the terminal expects to set the flexible time position as a receiving time position, or does not expect to set the flexible time position as a sending time position;

if the terminal indicates that a flexible time position is a non-expected receiving time position, it indicates that the terminal does not expect to set the flexible time position as a receiving time position, or expects to set the flexible time position as a sending time position;

if the terminal indicates that a flexible time position is an expected sending time position, it indicates that the terminal expects to set the flexible time position as a sending time position, or does not expect to set the flexible time position as a receiving time position;

if the terminal indicates that a flexible time position is a non-expected sending time position, it indicates that the terminal does not expect to set the flexible time position as a sending time position, or expects to set the flexible time position as a receiving time position;

if the terminal indicates that a flexible time position is a non-expected position, it indicates that the terminal does not expect to set the flexible time position as a receiving time position or a sending time position; and if the terminal indicates that a flexible time position is an expected position, it indicates that the terminal expects to set the flexible time position as a sending time position or a receiving time position.

11. The terminal according to claim 10, wherein the type of a transmission time position comprises any one of the following: a sending time position, a receiving time position, and a flexible time position.

12. The terminal according to claim 11, wherein transmission time positions of a same type in the transmission period are consecutive.

13. The terminal according to claim 10, wherein the first expectation information further comprises expectation identification information of each transmission time position in the transmission period;

wherein the expectation identification information is used to indicate either of the following:

indicating that the transmission time position is an expected transmission time position; and indicating that the transmission time position is a non-expected transmission time position.

14. The terminal according to claim 13, wherein in a case that the transmission time position is a flexible time position, the expectation identification information is used to indicate any one of the following:

indicating that the transmission time position is an expected sending time position;

indicating that the transmission time position is a non-expected sending time position;

indicating that the transmission time position is an expected receiving time position; and indicating that the transmission time position is a non-expected receiving time position.

15. The terminal according to claim 10, wherein the first expectation information is indicated by a bitmap.

16. The terminal according to claim 10, wherein the carrier type information comprises at least one of the following: a subcarrier spacing SCS, a cyclic prefix CP, cell identification information, cell group identification information, bandwidth part BWP identification information, and frequency identification information.

* * * * *